US009657727B2

(12) United States Patent
Osborn

(10) Patent No.: US 9,657,727 B2
(45) **Date of Patent: *May 23, 2017**

(54) WATER AMUSEMENT AND HYDRATION BICYCLE

(71) Applicant: Calvin Osborn, Ogden, UT (US)

(72) Inventor: Calvin Osborn, Ogden, UT (US)

(73) Assignee: Calvin Osborn, Ogden, UT (US)

( * ) Notice: Subject to any disclaimer, the term of this patent is extended or adjusted under 35 U.S.C. 154(b) by 360 days.

This patent is subject to a terminal disclaimer.

(21) Appl. No.: 14/518,926

(22) Filed: Oct. 20, 2014

(65) Prior Publication Data

US 2015/0377225 A1 Dec. 31, 2015

Related U.S. Application Data

(60) Provisional application No. 61/998,465, filed on Jun. 30, 2014, provisional application No. 61/998,466, filed on Jun. 30, 2014.

(51) Int. Cl.
*B05B 9/04* (2006.01)
*B62J 11/02* (2006.01)
(Continued)

(52) U.S. Cl.
CPC ................ *F04B 9/14* (2013.01); *B05B 9/002* (2013.01); *B05B 9/047* (2013.01); *B05B 9/0894* (2013.01);
(Continued)

(58) Field of Classification Search
CPC . F04B 9/14; F04B 43/08; B05B 9/002; B05B 9/047; B05B 9/0894; B05B 17/08; B05B 11/3087; B62J 11/00; E03B 9/20
(Continued)

(56) References Cited

U.S. PATENT DOCUMENTS 3,677,446 A 7/1972 Guyer, Jr. et al.
5,143,390 A * 9/1992 Goldsmith ............... B62J 11/02 222/105

(Continued)

OTHER PUBLICATIONS

Stihl Sprayers; http://stihldealer.net/pages/sprayers/?gclid=CJiC_6WYtL8CFQmMaQodJR8A1Q; Accessed Jul. 7, 2014; 1 page.

(Continued)

*Primary Examiner* — Anne Marie Boehler

(74) *Attorney, Agent, or Firm* — Thorpe, North & Western, LLP

(57) ABSTRACT

A water amusement and hydration bicycle can include a bicycle frame and a container to contain water carried by the bicycle frame, the container having an outlet port and a multipurpose port. The bicycle can also include an amusement nozzle removably coupled to the outlet port. The bicycle can further include a drinking nozzle removably coupleable to the multipurpose port. The bicycle can still further include a water pump carried by the bicycle frame and operable to pump the water from the container through the outlet port for delivery to the amusement nozzle. In addition, the bicycle can include a gas pump operable to pressurize gas in the container to move the water from the container through the multipurpose port for delivery to the drinking nozzle when the drinking nozzle is coupled to the multipurpose port. The multipurpose port can be coupleable to a water source to provide water to the container.

23 Claims, 5 Drawing Sheets

(51) Int. Cl.

| | |
|---|---|
| ***B62K 19/40*** | (2006.01) |
| ***F04B 9/14*** | (2006.01) |
| ***E03B 9/20*** | (2006.01) |
| ***B05B 9/00*** | (2006.01) |
| ***B05B 9/047*** | (2006.01) |
| ***B62J 11/00*** | (2006.01) |
| ***F04B 43/08*** | (2006.01) |
| ***B05B 17/08*** | (2006.01) |
| *B05B 9/08* | (2006.01) |
| *B05B 15/06* | (2006.01) |

(52) U.S. Cl.
CPC ............... *B05B 17/08* (2013.01); *B62J 11/00* (2013.01); *E03B 9/20* (2013.01); *F04B 43/08* (2013.01); *B05B 9/0403* (2013.01); *B05B 9/0811* (2013.01); *B05B 15/061* (2013.01)

(58) Field of Classification Search
USPC ................. 222/175; 280/288.4, 201; 307/66; 224/414; 239/323, 328
See application file for complete search history.

(56) References Cited

U.S. PATENT DOCUMENTS

| | | | | |
|---|---|---|---|---|
| 5,645,404 | A | 7/1997 | Zelenak | |
| 5,851,017 | A * | 12/1998 | Eden | B62J 11/00 222/192 |
| 6,196,474 | B1 * | 3/2001 | Hillerson | B05B 9/0805 222/608 |
| 6,953,135 | B2 * | 10/2005 | Litton | B62J 9/001 224/414 |
| 7,243,860 | B2 | 7/2007 | Junkel et al. | |
| 8,083,105 | B2 | 12/2011 | Reichert et al. | |
| 8,136,702 | B2 | 3/2012 | Skillern et al. | |
| 8,308,179 | B2 * | 11/2012 | Cote | B62K 3/04 280/288.3 |
| 8,814,063 | B1 * | 8/2014 | Millan | A45F 3/18 222/175 |
| 9,296,001 | B2 * | 3/2016 | Carrozza | B05B 9/08 |
| 9,488,164 | B2 * | 11/2016 | Osborn | E03B 9/20 |
| 2008/0029561 | A1 | 2/2008 | Reichert et al. | |
| 2009/0107562 | A1 * | 4/2009 | Wang | E03B 11/06 137/357 |
| 2009/0236815 | A1 * | 9/2009 | O'Toole | A63G 25/00 280/201 |
| 2012/0152811 | A1 | 6/2012 | Wright | |
| 2012/0186656 | A1 * | 7/2012 | Fitzgerald | A45F 3/04 137/1 |
| 2012/0193382 | A1 * | 8/2012 | Wilson | B62J 99/00 224/414 |
| 2014/0239092 | A1 * | 8/2014 | Carrozza | B05B 11/3057 239/172 |

OTHER PUBLICATIONS

Hudson NeverPump Bak-Pak; http://www.northerntool.com/shop/tools/product_200332331_200332331; Accessed Jul. 7, 2014; 2 pages.

Chapin Deluxe Backpack Sprayer; http://www.northerntool.com/shop/tools/product_200456735_200456735; Accessed Jul. 7, 2014; 1 page.

Geigerring Hydration Packs; http://www.geigerrig.com/; Accessed Jul. 7, 2014; 5 pages.

Veskimo Hydration Backpack; http://www.veskimo.com/personal-cooling-hydration-backpack.html; Accessed Jul. 7, 2014; 2 pages.

Super Soaker Nerf Hydro Pack; http://www.amazon.com/SuperSoakerNerfHydroPack/dp/B009TQA8OY/ref=sr_1_7?ie=UTF8&qid=1404772008&sr=8-7&keywords=electric+water+gun; Accessed Jul. 7, 2014; 5 pages.

U.S. Appl. No. 14/518,895, filed Oct. 20, 2014; Calvin Osborne.

* cited by examiner

WATER AMUSEMENT AND HYDRATION BICYCLE

PRIORITY CLAIM

Priority is claimed to U.S. Provisional Patent Application Ser. Nos. 61/998,465 and 61/998,466, both filed Jun. 30, 2014, each of which is hereby incorporated herein by reference in its entirety.

BACKGROUND

Field of the Invention

The present invention relates generally to water dispensing devices. More particularly, the present invention relates to water dispensing devices carried by bicycles.

Related Art

There have been several attempts to combine water amusement devices, such as squirt guns, with bicycles. Typically, such devices are simply mounted to a bicycle and utilize hand-operated pumps to pressurize air, which is then used to propel water from the devices. Although claimed launch ranges can approach 50 feet, such devices require the user to manually pump the devices to generate the energy required to propel the water. Repeated use of the devices can therefore become tiresome for children, which reduces the effectiveness of the devices. In addition, due to the relatively high pressure water delivery of these devices, it is difficult to use these devices for hydration purposes.

SUMMARY OF THE INVENTION

It has been recognized that it would be advantageous to develop a water amusement and hydration bicycle that provides ample water pressure for amusement purposes, while also being capable of providing lower pressure water delivery for hydration purposes.

The invention provides a water amusement and hydration bicycle, which can include a bicycle frame and a container to contain water carried by the bicycle frame. The container can have an outlet port and a multipurpose port. An amusement nozzle can be removably coupled to the outlet port and a drinking nozzle can be removably coupleable to the multipurpose port. The bicycle can also include a water pump carried by the bicycle frame and operable to pump the water from the container through the outlet port for delivery to the amusement nozzle. In addition, the bicycle can include a gas pump operable to pressurize gas in the container to move the water from the container through the multipurpose port for delivery to the drinking nozzle when the drinking nozzle is coupled to the multipurpose port. The multipurpose port can be coupleable to a water source to provide water to the container.

In addition, the invention provides a water amusement and hydration bicycle, which can include a bicycle frame and a container to contain water carried by the bicycle frame. The container can have an outlet port, a multipurpose port, and a fill port. An amusement nozzle can be removably coupled to the outlet port and a drinking nozzle can be removably coupleable to the multipurpose port. The bicycle can also include a water pump carried by the bicycle frame and operable to pump the water from the container through the outlet port for delivery to the amusement nozzle. A gas chamber can be disposed within the container to contain pressurized gas. In addition, the bicycle can include a gas pump operable to pressurize gas in the gas chamber to move the water from the container through the multipurpose port for delivery to the drinking nozzle when the drinking nozzle is coupled to the multipurpose port. A wall of the gas chamber can act to stabilize the water in the container. The multipurpose port and the fill port can each be coupleable to a water source to provide water to the container.

Furthermore, the invention provides a water amusement and hydration bicycle including a bicycle frame and an insulated container carried by the bicycle frame and configured to contain water. The container can have an outlet port, a multipurpose port, and a fill port coupleable to a water source to provide water to the container. An amusement nozzle can be removably coupled to the outlet port via a fluid delivery conduit. The amusement nozzle can comprise a stream nozzle, a spray nozzle, and/or a mist nozzle. A drinking nozzle can be removably coupleable to the multipurpose port. The bicycle can also include a motorized water pump carried by the bicycle frame and operable to pump the water from the container through the outlet port for delivery to the amusement nozzle. A heat transfer mechanism can be associated with the container and configured to heat or cool the water in the container. A battery can be carried by the bicycle frame to power the water pump and the heat transfer mechanism, and an electrical outlet can be electrically coupled to the battery. The battery can be configured to provide power to an external electronic device electrically coupled to the electrical outlet. A misting fan can be electrically coupled to the battery and configured to direct mist created from water exiting the amusement nozzle toward a rider of the bicycle. A flexible bladder can be disposed within the container to contain pressurized gas. The bicycle can include a human-powered gas pump removably coupleable to the container and operable to pressurize gas in the gas chamber to move the water from the container through the multipurpose port for delivery to the drinking nozzle when the drinking nozzle is coupled to the multipurpose port. A wall of the flexible bladder can act to stabilize the water in the container. A reservoir can be removably coupleable to the multipurpose port to provide water to the container when coupled to the multipurpose port. Additionally, the bicycle can include a carrying strap coupled to the reservoir and configured to facilitate transporting the reservoir.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
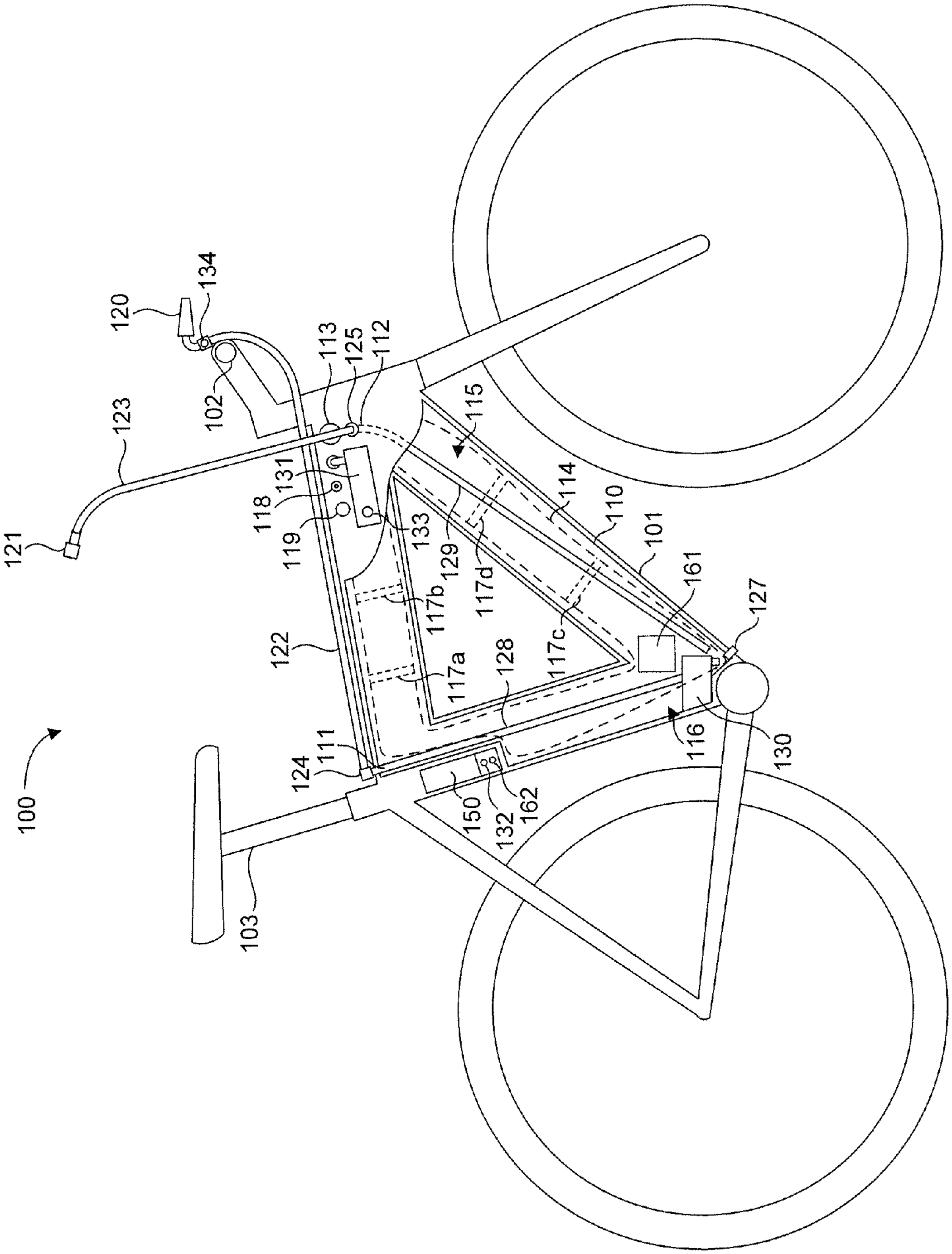
FIG. 1 is a schematic side view of a water amusement and hydration bicycle with a water container configured to be integrated within a bicycle frame and shown with a partial cutaway to reveal internal components in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Description

The present invention provides a water amusement and hydration bicycle capable of dispensing water from two ports to provide water for relatively high pressure applications and, alternatively, for relatively low pressure applications. In addition, the water amusement and hydration bicycle can be used to power lights, audio equipment, mobile devices, etc. Thus, the water amusement and hydration bicycle can be used in many different activities, including by way of example, water fights, bicycle activities (i.e., recreational rides, commuting, training rides, racing, and bike raves), hydration, and emergency uses (i.e., cleaning wounds, etc.). Example embodiments utilizing aspects of the present technology for a variety of amusement and hydration activities are described in copending U.S. patent application, Ser. No. 14/518,895, filed Oct. 20, 2014, which is hereby incorporated herein by reference in its entirety. Different nozzles can be used to provide a variety of spray patterns for higher pressure applications. Lower pressure applications can utilize suitable low pressure nozzles, such as a drinking nozzle or a misting nozzle. The present invention provides a water amusement and hydration bicycle with a water pump for higher pressure applications and a gas pump to pressurize gas for delivery of water in lower pressure applications. Furthermore, a reservoir can provide reserve water, which can then be pumped directly from the reservoir by the water pump for high pressure applications or stored for later use in any suitable application. Additionally, the water amusement and hydration bicycle can heat and/or cool the water or a beverage in the container and/or the reserve reservoir to dispense water or other beverage at a desired temperature.

FIGS. 1-4 illustrate a water amusement and hydration bicycle. The bicycle is indicated generally at 100 in example implementations in accordance with the invention. Some features typical of a bicycle, such as a crank or other drivetrain components, have been omitted for clarity in illustrating various aspects of the invention. In general, the bicycle 100 can include a bicycle frame 101, a container 110 to contain water carried by the bicycle frame 101, an amusement nozzle 120 coupled to the container 110, a water pump 130 to pump the water from the container 110 through the amusement nozzle 120, a drinking nozzle 121 coupleable to the container 110, and a gas pump 131 to pressurize gas (i.e., air) in the container 110 to move water from the container 110 through the drinking nozzle 121 when the drinking nozzle 121 is coupled to the container 110.

More specifically, the container 110 can have an outlet port 111, a multipurpose port 112, a fill port 113, and a drain port 127. The amusement nozzle 120, which can be mounted on a handlebar 102, can be removably coupled to the outlet port 111 via a hose 122 or other suitable conduit, and the drinking nozzle 121 can be removably coupled to the multipurpose port 112 via a hose 123 or other suitable conduit. The hose 122 and/or the hose 123 can be of any suitable length or construction. For example, the hose 122 and/or hose 123 can be insulated. An internal conduit 128 can fluidly couple the water pump 130 to the outlet port 111. An internal conduit 129 can have a lower end disposed at or near a bottom of the container 110 to facilitate removal of water from the container via the multipurpose port 112, as described further hereinafter. It should be recognized that the outlet port 111, the multipurpose port 112, the fill port 113, and/or the drain port 127 can be located in any suitable location. For example, in some embodiments, the outlet port 111 and the multipurpose port 112 can be located at a bottom end of the container 110 and the fill port can be located at a top end of the container 110.

In one aspect, the amusement nozzle 120 can comprise a stream nozzle, a spray nozzle, and/or a mist nozzle. In one example, the amusement nozzle 120 can be adjustable to provide for a variety of different spray and/or stream patterns. In another aspect, the drinking nozzle 121 can comprise a personal hydration nozzle, such as a "bite" valve or other such valve that can be operated by a user's mouth. Thus, when equipped with the drinking nozzle 121, the bicycle 100 can have two water dispensing nozzles and hoses. Couplings 124, 125 for the hoses 122, 123 can be of any suitable type. In one aspect, the couplings 124, 125 can be "quick connect" couplings for easy and rapid coupling and decoupling of the hoses 122, 123. In another aspect, the couplings 124, 125 can be associated with manual and/or automatic valves to prevent water leakage when decoupled.

Figure 2:
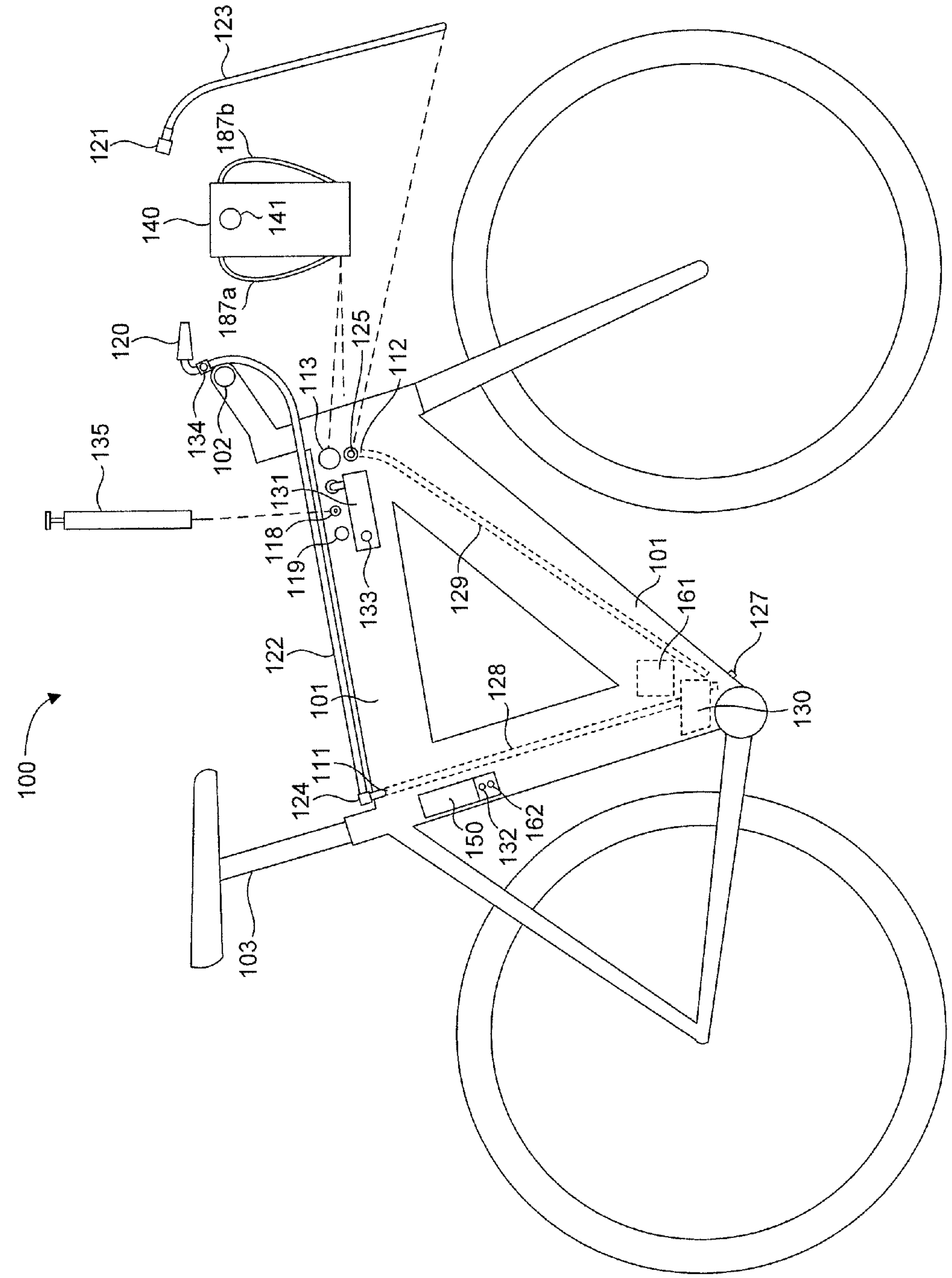
FIG. 2 is a schematic side view of a water amusement and hydration bicycle showing water and gas connections in accordance with an embodiment of the present invention.
Figure 4:
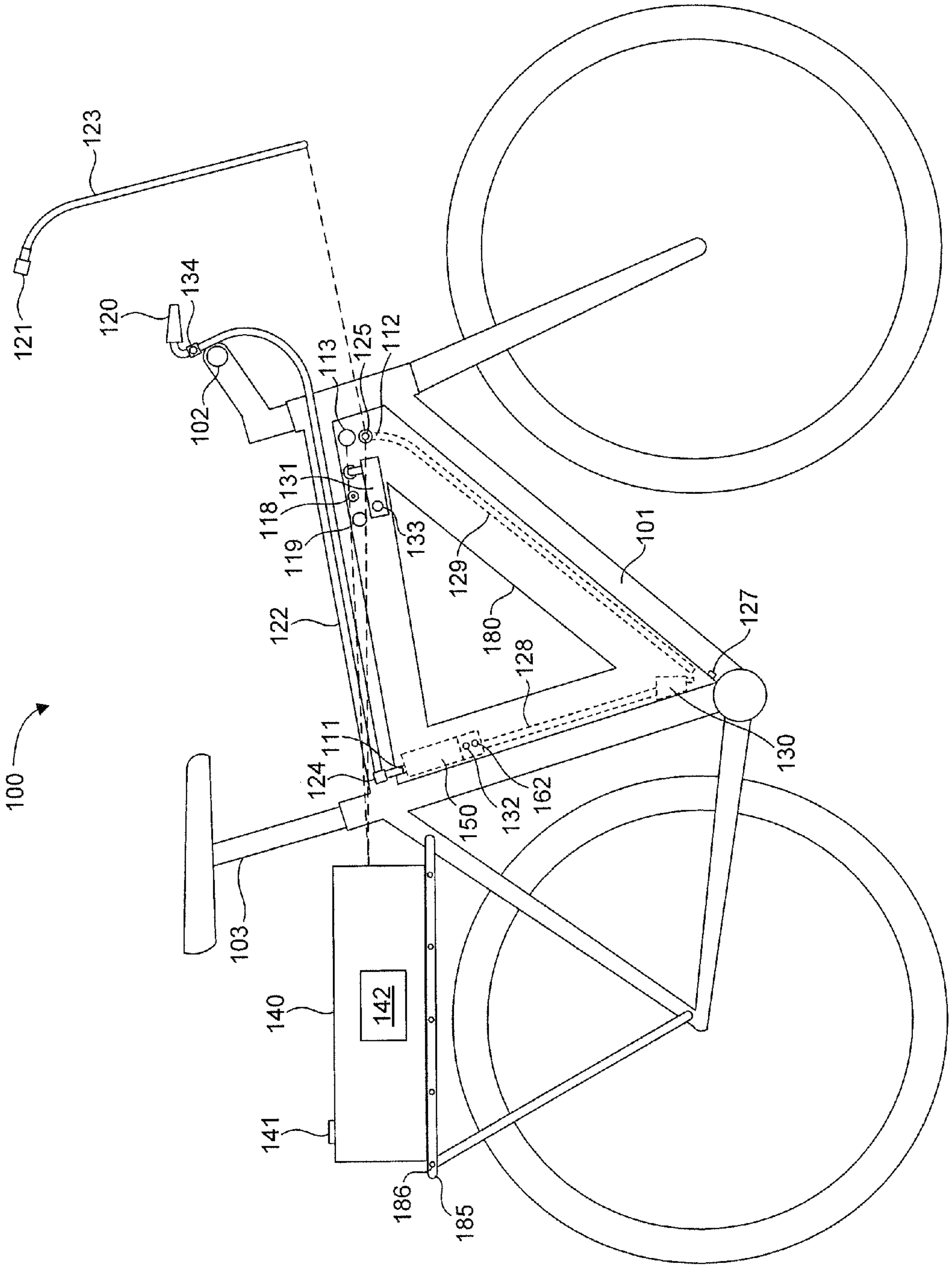
FIG. 4 is a schematic side view of a water amusement and hydration bicycle with a water container configured to be removably attached to a bicycle frame in accordance with an embodiment of the present invention.

The water pump 130 can be operable to pump water from the container 110 through the outlet port 111 for delivery to the amusement nozzle 120. For example, the outlet port 111 can be configured to directly extend from the container 110 or from the water pump 130, such as when the water pump 130 is disposed inside the container 110. On the other hand, the gas pump 131 can be operable to pressurize gas in the container 110 to move water from the container 110 through the multipurpose port 112 for delivery to the drinking nozzle 121 when the drinking nozzle 121 is coupled to the multipurpose port 112. Thus, multiple pumps of different types can be used to dispense water from the container 110 via respective ports and for different purposes. For example, the water pump 130 can be used to provide water at relatively high pressures, such as for a water fight, and the gas pump 131 can be used to provide water at relatively low pressures, such as light misting, light spraying, and drinking. In one aspect, the multipurpose port 112 can be located at a bottom of the container 110 so that water can also drain from the container 110 via the multipurpose port 112 under the influence of gravity. In addition, the multipurpose port 112 and the fill port 113 can each be coupled to a water source to provide water to the container 110. For example, a reservoir 140 (FIGS. 2 and 4) can be removably coupled to the multipurpose port 112 of the container 110 to serve as a water source for the container 110. It should be recognized that the reservoir 140 can also be coupled to the fill port 113 to provide water to the container 110. The reservoir 140 can be of any suitable configuration. In some examples, the reservoir 140 can be collapsible for reduced storage size. In one aspect, the reservoir 140 can be configured to be carried by a rider of the bicycle 100 and can include one or more carrying straps 187*a*, 187*b* to support the reservoir 140 about the rider in a manner similar to a backpack (FIG. 2). In another aspect, the reservoir 140 can be carried by a rack 185 coupled to the bicycle frame 101 (FIG. 4). The fill port 113 of the container 110 and/or a fill port 141 of the reservoir 140 can include a water input filter to remove contaminants from the water prior to entry into the container 110 and/or the reservoir 140.

The water pump 130 and/or the gas pump 131 can be any suitable type of motorized pump. Accordingly, the bicycle 100 can include a power source, such as a battery 150 (i.e., 12 volt or any other suitable battery type or voltage), to power the motorized pumps. The motorized pumps can be electrically coupled to the battery 150 in any suitable manner, such as by wires 151, 152, cables, etc. In one aspect, wires or cables forming electrical connections disclosed herein may be bundled and combined in a wiring harness for convenience in routing and forming the electrical connections. Operation of the water pump 130 and the gas pump 131 can be controlled locally by switches 132, 133, respectively. The switches described herein can be of any suitable configuration for controlling an associated device, such as the pumps 130, 131. For example, a switch can comprise a dial, trigger, toggle, lever, button, etc. In addition, the water pump 130 can be controlled by a switch 134 associated with the amusement nozzle 120 and electrically coupled via a wire 153 or cable to the water pump 130 to remotely control operation of the water pump 130 to dispense water from the nozzle 120. In one aspect, the water pump 130 can be a variable speed pump and the switch 132 and/or the switch 134 can be configured to control the variable speed pump to obtain a desired flow rate of water.

Figure 3:
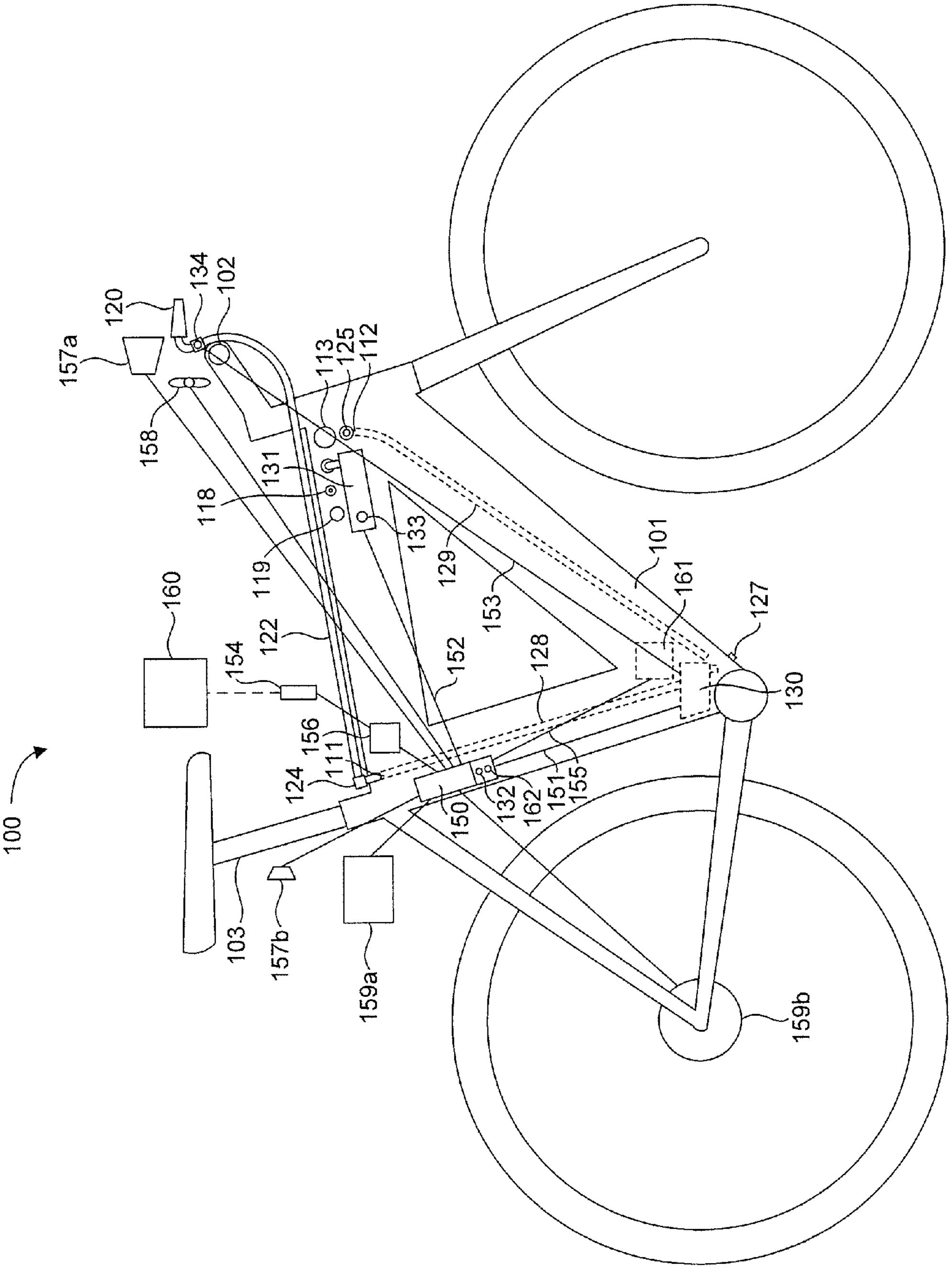
FIG. 3 is a schematic side view of a water amusement and hydration bicycle showing electrical connections with various components in accordance with an embodiment of the present invention.
Figure 5:
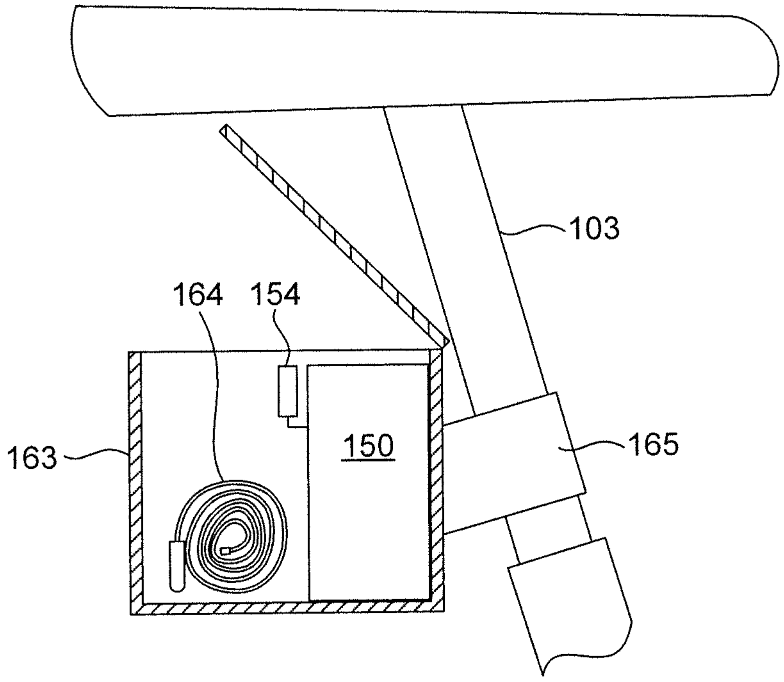
FIG. 5 is a detail view of a storage case mounted to a seat post of a water amusement and hydration bicycle in accordance with an embodiment of the present invention.

In addition to providing power for the pumps, 130, 131, the battery 150 can be configured to power various other components and peripherals of the bicycle 100, as described in more detail hereinafter and particularly as illustrated in FIG. 3. In one aspect, an electrical coupling 154, such as an electrical outlet, can be coupled to the battery 150 to provide power to a device 160 or component external to the bicycle 100. For example, the battery 150 can be used to charge a personal electronic device, such as a cell phone, power an audio device, etc. In addition, the battery 150 can be used to power a light 157*a,* 157*b* for the bicycle 100. In one aspect, the battery 150 can also be electrically coupled to a misting fan 158. The misting fan 158, which can be mounted to the handlebar 102, can be configured to direct mist created from water exiting the amusement nozzle 120 toward a rider of the bicycle 100 to cool the rider. In one aspect, the battery 150 can be rechargeable, and can be recharged via the electrical coupling 154. For example, the battery 150 can be recharged from a 110 volt outlet, a portable battery charger, a solar battery charger, a 12 volt vehicle outlet, etc. Although only a single electrical coupling is illustrated, it should be recognized that any suitable number of electrical couplings can be included. The bicycle 100 can include an AC/DC power conversion device 156 to facilitate charging the DC battery 150 with an AC power source and/or to provide AC power from the DC battery 150 to power external components. In one aspect, a solar battery charger 159*a* can be coupled to the battery 150 for continuous charging when exposed to light. In another aspect, a generator 159*b* can be coupled to the battery 150 for continuous charging when the bicycle 100 is in motion. Accordingly, the generator 159*a* can be operable with a wheel, brake, and/or a portion of the drive train. As with any other device or component electrically connected to the battery 150, the solar battery charger 159*a* and/or the generator 159*b* can be coupled directly to the battery 150 and/or via the electrical coupling 154. In should be recognized that the battery 150 can be attached to any portion of the bicycle frame 101 or to any component or feature of the bicycle 100, such as the seat post 103 (FIG. 5). It should also be recognized that any suitable number of batteries can be included. For example, multiple batteries can be used to accommodate a variety of different power needs, such as to power various components and features of a bicycle 100 configured for a rave party, cooling and hydration, and/or a water fight. In one aspect, the bicycle 100 can include a rear battery 150 attached to the seat post 103 (FIG. 5) and a front battery attached to the bicycle frame 101. In this case, the front battery can power one or more pumps 130, 131 to dispense water and the rear battery can power lighting on the bicycle 100, such as functional lights (e.g., front/rear lights 157*a,* 157*b*) and/or decorative lights (e.g., multicolored light strips, illuminated manufacturer/model name, etc.), power accessories, and/or power an electric motor to assist a rider in pedaling the bicycle 100. Such a motor can be useful to help the rider overcome the additional weight of the on-board water, battery, etc. carried by the bicycle 100.

The bicycle 100 can include a storage case 163 (FIG. 5) that can be used to contain the battery 150, the electrical coupling 154, and/or a power extension cord 164 or other utility item for the device 100, such as a water hose, a water hose extension, and/or a selection of nozzles, or any other miscellaneous item. The storage case 163 can include a mounting bracket 165 and can be supported about the seat post 103 or any other part of the bicycle 100, such as the bicycle frame 101. The storage case 163 can be removable or permanently attached.

In one aspect illustrated in FIG. 1, the water and gas in the container 110 can be physically separated from one another, such as by a flexible bladder 114, thereby defining a water chamber 115 in fluid communication with the water pump 130, and a gas chamber 116 in fluid communication with the gas pump 131. For example, water can be held in the flexible bladder 114, thus defining the water chamber 115 inside the flexible bladder 114 and the gas chamber 116 outside the flexible bladder 114, but within the container 110. It should be recognized that gas can be held in the flexible bladder 114, thus defining the gas chamber 116 inside the flexible bladder 114 and the water chamber 115 outside the flexible bladder 114, but within the container 110. In some examples, one flexible bladder can serve as a water chamber and another flexible bladder can serve as a gas chamber, both of which can be within the container 110. By physically separating the water and gas within the container 110, dirty or polluted gas (i.e., air) pumped into the container 110 can be prevented from contaminating the water, which may be used for drinking. Furthermore, by containing gas at a predetermined pressure, a wall of the gas chamber 116, such as a portion of the flexible bladder 114, can act to stabilize the water in the container 110. This can reduce or minimize instability of the bicycle 100 when in motion. For example, increased gas pressure within the gas chamber 116 can cause the flexible bladder 114 to expand, thus exerting a force on the water in the water chamber 115. When at least a portion of the gas chamber 116 is disposed over at least a portion of the water chamber 115, the pressurized gas chamber 116 can act as a lid on top of the water chamber 115, thus stabilizing the water and minimizing sloshing as the bicycle 100 is moved.

In addition, as further illustrated in FIG. 1, the water chamber 115 can include one or more baffles 117*a-d* to reduce or minimize sloshing of the water in the water chamber 115, thereby enhancing stability of the bicycle 100 when in motion. The baffles 117*a-d* can extend at least partially across the water chamber 115 and can be configured to resist the movement of water within the water chamber 115. In one aspect, the baffles 117*a-d* can include openings or holes in an otherwise solid structure through which water can flow. The size, quantity, and location of the openings or holes, as well as the quantity and location of the baffles 117*a-d* can be configured to minimize undesirable sloshing or movement of water within the water chamber 115 while allowing the water to flow sufficiently to facilitate movement of the water through the water chamber 115 as caused by the water pump 130 and/or the gas pump 131. In one aspect, the water pump 130 can be located at a bottom of the water chamber 115 and/or the container 110 to facilitate pumping water from the container 110.

As mentioned above, the gas pump 131 can be used to pressurize the container 110 (i.e., with outside air) to dispense water from the container 110 via the multipurpose port 112. In addition, the gas pump 131 can be configured to maintain a predetermined gas pressure in the container 110 as water is removed from the container 110. This can ensure that sufficient pressure is available within the container 110 to dispense water from the container 110 via the multipurpose port 112. For example, operation of the gas pump 131 and the water pump 130 can be coordinated so that as water is dispensed from the container 110 by the water pump 130, the gas pump 131 can operate automatically to maintain gas pressure in the container 110, thus providing gas pressure for dispensing water from the multipurpose port 112 and/or for stabilizing the water in the container 110, as discussed above. In this mode of operation, the gas pump 131 can function based on a sensed gas pressure within the container 110 and/or based on operation of the water pump 130.

In one aspect, a gas pump of the bicycle 100 can be powered by a human to pressurize gas in the container 110, thereby dispensing water from the container 110 via the multipurpose port 112, and without utilizing the water pump 130 to dispense water. For example, the gas pump 131 can be human-powered and/or the bicycle 100 can include a separate human-powered gas pump 135 (FIG. 2) that is removably coupleable to the container 110, such as by a gas port 118, to pressurize gas in the container 110. In one aspect, the gas port 118 can include a sealing plug operable with an inflation needle to serve as a one-way valve and facilitate pressurizing gas in the container 110. The gas port 118 can include any suitable valve or feature to facilitate pressurizing gas in the container 110, such as a Schrader valve, a Presta valve, or any other valve used for air inflation. A human-powered gas pump can be a hand pump, a floor pump, or any other suitable type of human-powered pump. Thus, with a human-powered gas pump, the bicycle 100 can provide water dispensing functionality even when the battery 150 is unable to operate the water pump 130. It should be recognized that an external motorized gas pump can also be used to pressurize gas in the container 110, such as a compressed air pump at a service station. In addition, the container 110 can include a gas pressure relief valve 119 to discharge gas from within the container 110. In some examples, such as when the gas port 118 includes a Schrader valve or a Presta valve, the gas port 118 can be operable to discharge gas from within the container 110. The gas pump 131, the gas port 118, and the gas pressure relief valve 119 can therefore be fluidly coupled to the gas chamber 116 within the container 110.

The components of the bicycle 100 that may come into contact with water can be made of any suitable material for such use. For example, the container 110, flexible bladder 114, hoses 122, 123, nozzles 120, 121, reservoir 140, and internal pump components can be made of steel, aluminum, plastic, rubber, etc. that can withstand the operating pressures and water environment of the bicycle 100. In one aspect, such components can be constructed of food-safe materials. Thus, the bicycle 100 can be suitable for use with water or other consumable liquids, such as beverages (i.e., water, coffee, tea, soft drinks, wine, beer, etc.).

In one aspect, the bicycle 100 can include a heat transfer mechanism 161 that can be associated with the container 110 to heat and/or cool the water. The heat transfer mechanism 161 can comprise any suitable heating and/or cooling device or structure known in the art suitable for use in the bicycle 100. The heat transfer mechanism 161 can be controlled by a switch 162 that controls power to the heat transfer mechanism 161 from the battery 150 via a wire 155 or cable. In one aspect, the container 110 and/or the water chamber 115 can be insulated to minimize or reduce heat transfer to/from the water through the container 110 and/or the water chamber 115. Thus, the container 110 can be configured to receive water from an external source, such as the reservoir 140, and heat and/or cool the water prior to dispensing the water for use. In one aspect, the heat transfer mechanism 161 can be removable from the bicycle 100 and can be configured to receive power from the battery 150 via the electrical coupling or outlet 154. In some embodiments, the bicycle 100 can include a heat transfer mechanism 142 (FIG. 4) that can be associated with the reservoir 140 to heat and/or cool the water. The heat transfer mechanism 142 can be electrically connected to the battery 150 in any suitable manner, such as via the electrical coupling 154. Thus, the reservoir 140 can provide hot or cold water to the container 110. The heat transfer mechanism 142 can be permanently coupled or removably attached to the reservoir 140.

In use, the water pump 130 can directly pump water from the container 110 via the outlet port 111 and deliver the water to the amusement nozzle 120 for dispensing. A water source, such as a tap, may be used to refill the container 110 with water via the fill port 113. If no other water sources are available, the reservoir 140 can serve as a reserve tank and can be coupled to the container 110 to provide water for the water pump 130. In this case, the water pump 130 can draw water from the reservoir 140 into the container 110, and then pump the water from the container 110 to the amusement nozzle 120. When the reservoir 140 is connected to the multipurpose port 112, the gas pump 131 can be switched off (e.g., to disable automatic operation of the gas pump 131) to prevent pressurizing the container 110 with gas. This can prevent the flexible bladder 114 from filling with gas and impeding the flow of water into the container. Thus, the reservoir 140 can provide water to the container 110 as water is dispensed from the container 110.

The water pump 130 can be capable of producing high pressure flow, shooting a stream of water at a distance of greater than 50 feet. The gas pump 131, on the other hand, will typically deliver water at a lower pressure than that provided by the water pump 130, The gas pump 131 can therefore be adequate for low pressure uses, such as drinking, washing hands, etc. The gas pump 131 can pressurize gas in the container 110 to dispense water from the container via the multipurpose port 112, in which case the drinking nozzle 121 can be used. If the battery 150 is insufficient to operate a motorized water pump 130 and/or gas pump 131 or if battery power is being conserved, the human-powered gas pump 135 may be used to dispense water from the container via the multipurpose port 112. The human-powered gas pump 135 can therefore provide backup for the motorized pumps to ensure that water is available even when the battery 150 has been drained of power. In one aspect, the gas pump 131 can be human-powered. In another aspect, the battery 150 can be removable from the bicycle 100 to reduce weight. In this case, a human powered gas pump, such as the gas pump 131 and/or the gas pump 135, can be used to provide water for drinking.

Although the water pump 130 in FIG. 1 is illustrated as being within the bicycle frame 101 but external to the water chamber 115, it should be recognized that the water pump 130 can be disposed within the water chamber 115 and, in some examples, outside the container 110 and/or the bicycle frame 101. Similarly, although the gas pump 131 is shown external to the bicycle frame 101, the gas pump 131 can be located internal to the bicycle frame 101. The bicycle frame 101 can be configured to provide user access for the switches 132, 133, 162, the electrical coupling 154, the fill port 113, the drain port 127, the gas port 118, and/or the gas pressure relief valve 119. In addition, the couplings 124, 125 can be supported about the bicycle frame 101 to provide access for a user when coupling/decoupling the hoses 122, 123. In some examples, the hose 122 and/or the hose 123 can be retractable or tucked into the bicycle frame 101 and alternately extendable therefrom to a desired length. In one aspect, the bicycle frame 101 and/or the container 110 can be insulated.

Many of the components of the bicycle 100 can be contained within and/or coupled to the bicycle frame 101 or some other component or feature typical of a bicycle. For example, the container 110, the water pump 130, the gas pump 131, and/or the battery 150 can be supported about the bicycle frame 101, handlebar 102, seat post 103, etc. In some embodiments, the container 110, the water pump 130, the gas pump 131, and/or the battery 150 can be disposed at least partially within the bicycle frame 101. In one aspect, the bicycle frame 101 can define at least a portion of the container 110. For example, the bicycle frame 101 can comprise a tubular member that forms at least a portion of the container 110. In another aspect, the container 110 can be distinct from the bicycle frame 101. In this case, the bicycle frame 101 can serve as a housing or case for the container 110. In yet another aspect, the container 110 can be removably coupleable to the bicycle frame 101. For example, the container 110 can be removable from within at least a portion of the bicycle frame 101, such as when the bicycle frame 101 serves as a housing or a case for the container 110.

In another example, the container 110 can be removably coupleable to an exterior of the bicycle frame 101. As illustrated in FIG. 4, the bicycle 100 can include a housing or case 180. Many of the components of the bicycle 100, such as the container 110, can be contained within and/or coupled to the housing 180. For example, the container 110, the water pump 130, and/or the battery 150 can be contained at least partially within the housing 180, and the gas pump 131 can be coupled to an exterior of the housing 180. These components can therefore form a self-contained unit that can be removably attached to the bicycle frame 101. Thus, in one aspect, such a self-contained unit can be retrofitted to an existing bicycle, along with the amusement nozzle 120, the drinking nozzle 121, the associated hoses 122, 123, and/or various other components described herein, to convert the bicycle into a water amusement and hydration bicycle 100 in accordance with the present disclosure.

In one aspect, the housing 180 can define at least a portion of the container 110. For example, the housing 180 can comprise a hollow or tubular member that forms at least a portion of the container 110. Although the water pump 130 is illustrated as being within the housing 180, it should be recognized that the water pump 130 can be disposed outside the housing 180. Similarly, although the gas pump 131 is shown external to the housing 180, the gas pump 131 can be located internal to the housing 180. The housing 180 can be configured to provide user access for the switches 132, 133, 162, the electrical coupling 154, the fill port 113, the drain port 127, the gas port 118, and/or the gas pressure relief valve 119. In addition, the couplings 124, 125 can be supported about the housing 180 to provide access for a user when coupling/decoupling the hoses 122, 123. In some examples, the hose 122 and/or 123 can be retractable or tucked into the housing 180 and alternately extendable therefrom to a desired length. In one aspect, the housing 180 can be insulated.

As mentioned above, the rack 185 illustrated in FIG. 4 can carry or support the reservoir 140. It should also be recognized that the rack 185 can carry or support various other components of the bicycle 100. The rack 185 can include one or more coupling features 186, such as holes, clips, rings, D-rings, etc. to facilitate coupling items or other components to the rack 185, such as the reservoir 140 shown in the figure.

Although preferred embodiments of the invention have been described using specific terms, devices, and methods, such description are for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, and in part. Therefore, the spirit and scope of the appended claims should not be limited to the description of the preferred versions contained therein. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A water amusement and hydration bicycle, comprising:

a bicycle frame;

a container to contain water carried by the bicycle frame, the container having an outlet port and a multipurpose port;

an amusement nozzle removably coupled to the outlet port;

a drinking nozzle removably coupleable to the multipurpose port;

a water pump carried by the bicycle frame and operable to pump the water from the container through the outlet port for delivery to the amusement nozzle;

a gas pump operable to pressurize gas in the container to move the water from the container through the multipurpose port for delivery to the drinking nozzle when the drinking nozzle is coupled to the multipurpose port, wherein the multipurpose port is coupleable to a water source to provide water to the container.

2. The water amusement and hydration bicycle of claim 1, wherein the container further comprises a fill port coupleable to a water source to provide water to the container.

3. The water amusement and hydration bicycle of claim 1, wherein the gas pump is a human-powered pump.

4. The water amusement and hydration bicycle of claim 1, wherein at least one of the water pump and the gas pump is a motorized pump.

5. The water amusement and hydration bicycle of claim 4, wherein the gas pump is configured to maintain a predetermined gas pressure in the container as water is removed from the container.

6. The water amusement and hydration bicycle of claim 5, further comprising a gas chamber in fluid communication with the gas pump and disposed within the container to contain gas at the predetermined pressure, wherein a wall of the gas chamber acts to stabilize the water in the container.

7. The water amusement and hydration bicycle of claim 6, wherein the gas chamber is defined at least in part by a flexible bladder.

8. The water amusement and hydration bicycle of claim 4, further comprising a battery to power the at least one motorized pump.

9. The water amusement and hydration bicycle of claim 8, further comprising an electrical outlet electrically coupled to the battery, wherein the battery is configured to provide power to an external electronic device electrically coupled to the electrical outlet.

10. The water amusement and hydration bicycle of claim 8, further comprising a misting fan electrically coupled to the battery and configured to direct mist created from water exiting the amusement nozzle toward a rider of the bicycle.

11. The water amusement and hydration bicycle of claim 1, further comprising a water chamber in fluid communication with the outlet port and the multipurpose port, and disposed within the container to contain the water.

12. The water amusement and hydration bicycle of claim 11, wherein the water chamber is defined at least in part by a flexible bladder.

13. The water amusement and hydration bicycle of claim 1, further comprising a reservoir removably coupleable to the multipurpose port of the container, wherein the reservoir is operable as the water source to provide water to the container when the reservoir is coupled to the multipurpose port.

14. The water amusement and hydration bicycle of claim 13, further comprising a carrying strap coupled to the reservoir and configured to facilitate transporting the reservoir.

15. The water amusement and hydration bicycle of claim 1, further comprising a heat transfer mechanism associated with the container to heat or cool the water.

16. The water amusement and hydration bicycle of claim 1, wherein the container is insulated.

17. The water amusement and hydration bicycle of claim 1, wherein the amusement nozzle comprises at least one of a stream nozzle, a spray nozzle, or a mist nozzle.

18. The water amusement and hydration bicycle of claim 1, wherein the container is removably coupleable to the bicycle frame.

19. The water amusement and hydration bicycle of claim 1, wherein the container is disposed, at least in part, within the bicycle frame.

20. The water amusement and hydration bicycle of claim 1, wherein the bicycle frame comprises a tubular member that defines at least a portion of the container.

21. A water amusement and hydration bicycle, comprising:

a bicycle frame;

a container to contain water carried by the bicycle frame, the container having an outlet port, a multipurpose port, and a fill port;

an amusement nozzle removably coupled to the outlet port;

a drinking nozzle removably coupleable to the multipurpose port;

a water pump carried by the bicycle frame and operable to pump the water from the container through the outlet port for delivery to the amusement nozzle;

a gas chamber disposed within the container to contain pressurized gas; and a gas pump operable to pressurize gas in the gas chamber to move the water from the container through the multipurpose port for delivery to the drinking nozzle when the drinking nozzle is coupled to the multipurpose port, wherein a wall of the gas chamber acts to stabilize the water in the container, and wherein the multipurpose port and the fill port are each coupleable to a water source to provide water to the container.

22. The water amusement and hydration bicycle of claim 21, wherein the container is disposed, at least in part, within the bicycle frame.

23. A water amusement and hydration bicycle, comprising:

a bicycle frame;

an insulated container disposed within the bicycle frame and configured to contain water, the container having an outlet port, a multipurpose port, and a fill port coupleable to a water source to provide water to the container;

an amusement nozzle removably coupled to the outlet port via a fluid delivery conduit, wherein the amusement nozzle comprises at least one of a stream nozzle, a spray nozzle, or a mist nozzle;

a drinking nozzle removably coupleable to the multipurpose port;

a motorized water pump carried by the bicycle frame and operable to pump the water from the container through the outlet port for delivery to the amusement nozzle;

a heat transfer mechanism associated with the container and configured to heat or cool the water in the container;

a battery carried by the bicycle frame to power the water pump and the heat transfer mechanism;

an electrical outlet electrically coupled to the battery, wherein the battery is configured to provide power to an external electronic device electrically coupled to the electrical outlet;

a misting fan electrically coupled to the battery and configured to direct mist created from water exiting the amusement nozzle toward a rider of the bicycle;

a flexible bladder disposed within the container to contain pressurized gas;

a human-powered gas pump removably coupleable to the container and operable to pressurize gas in the gas chamber to move the water from the container through the multipurpose port for delivery to the drinking nozzle when the drinking nozzle is coupled to the multipurpose port, wherein a wall of the flexible bladder acts to stabilize the water in the container;

a reservoir removably coupleable to the multipurpose port to provide water to the container when coupled to the multipurpose port; and a carrying strap coupled to the reservoir and configured to facilitate transporting the reservoir.

* * * * *